(12) United States Patent
Fujii et al.

(10) Patent No.: US 10,562,475 B2
(45) Date of Patent: Feb. 18, 2020

(54) VEHICLE BODY STRUCTURE

(71) Applicant: HONDA MOTOR CO., LTD., Tokyo (JP)

(72) Inventors: Momoka Fujii, Wako (JP); Tomohito Kamada, Wako (JP); Isamu Nakanishi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/029,866

(22) Filed: Jul. 9, 2018

(65) Prior Publication Data

US 2019/0016283 A1    Jan. 17, 2019

(30) Foreign Application Priority Data

Jul. 12, 2017    (JP) .................................. 2017-135882

(51) Int. Cl.
*B60R 19/24*    (2006.01)
*B60R 19/34*    (2006.01)

(52) U.S. Cl.
CPC .............. *B60R 19/24* (2013.01); *B60R 19/34* (2013.01); *B60R 2019/247* (2013.01)

(58) Field of Classification Search
CPC ................................. B60R 19/34; B60R 19/24
USPC .................. 293/133, 154; 296/187.09, 187.1
See application file for complete search history.

(56) References Cited

U.S. PATENT DOCUMENTS

| | | | |
|---|---|---|---|
| 7,854,454 B2 | 12/2010 | Yang et al. | |
| 8,985,671 B1 | 3/2015 | Lei et al. | |
| 2016/0236718 A1* | 8/2016 | Tatsuwaki | B62D 21/155 |
| 2017/0129432 A1* | 5/2017 | Daido | B60R 19/34 |
| 2018/0178742 A1* | 6/2018 | Hojo | B60R 19/34 |
| 2018/0370571 A1* | 12/2018 | Sekiya | B62D 21/152 |
| 2019/0168702 A1* | 6/2019 | Fujii | B60R 19/34 |

FOREIGN PATENT DOCUMENTS

| | | |
|---|---|---|
| JP | 2014-113894 A | 6/2014 |
| JP | 2017-039371 A | 2/2017 |

OTHER PUBLICATIONS

Machine Translation of JP2017-039371A, printed from the EPO website Aug. 8, 2019.*
Japanese Office Action dated Feb. 5, 2019, 9 pages.

* cited by examiner

*Primary Examiner* — Jason S Morrow
(74) *Attorney, Agent, or Firm* — Rankin, Hill & Clark LLP

(57) ABSTRACT

Provided is a vehicle body structure capable of preventing separation between a bumper beam and a bumper beam mounting member on the non-collision side at the time of an offset collision. The vehicle body structure includes a bumper beam, a pair of bumper beam mounting members, and a pair of holding members. The holding member includes an outer mounting portion for mounting an outer side in the vehicle width direction of the holding member on the bumper beam mounting member, and a front mounting portion for mounting an inner side in the vehicle width direction of the holding member on the front surface portion of the bumper beam. The front mounting portion extends to a position corresponding to a vehicle width direction inner end portion of the bumper beam mounting member in a front-rear direction at least on the front surface portion of the bumper beam.

7 Claims, 6 Drawing Sheets

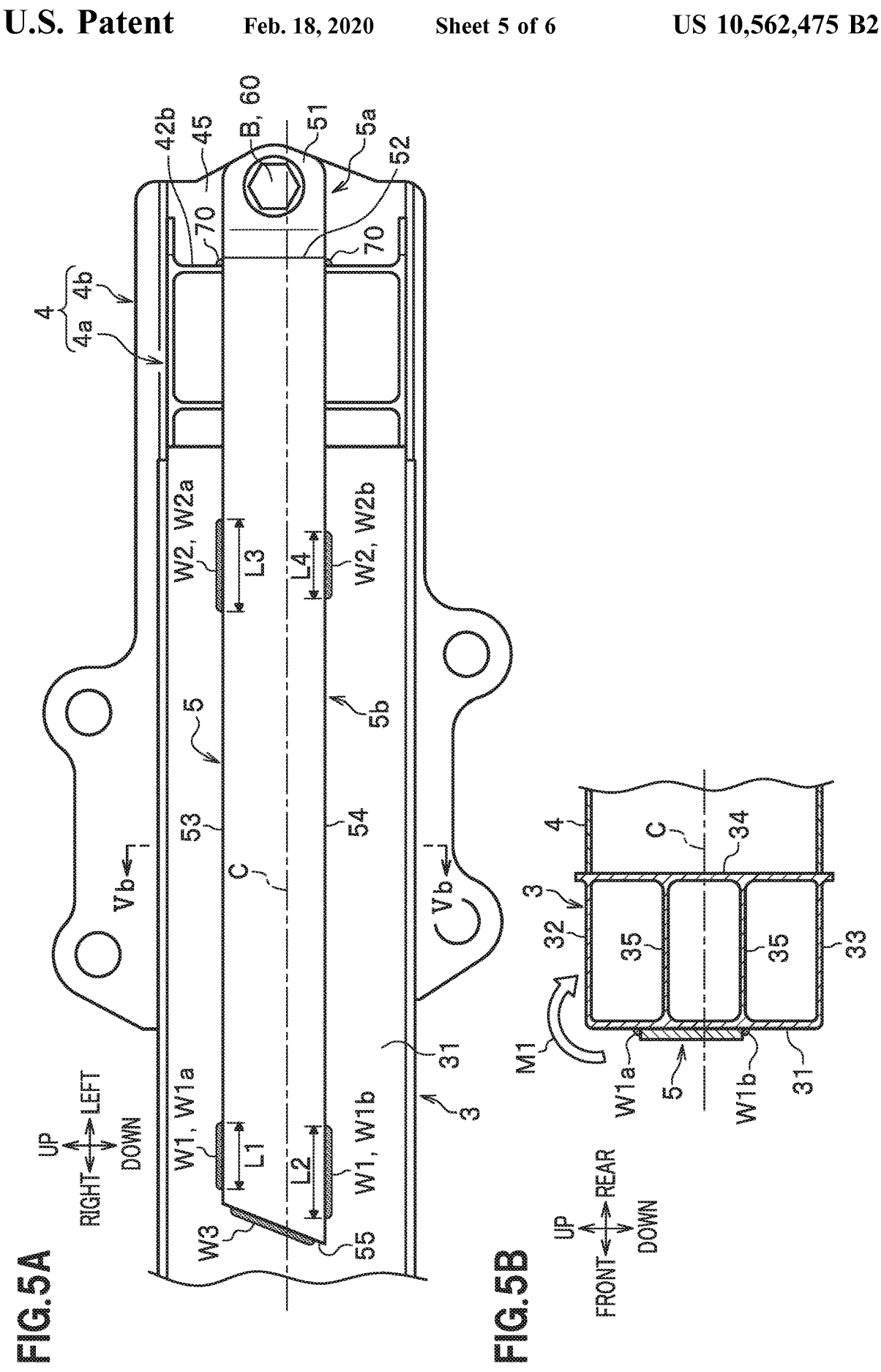

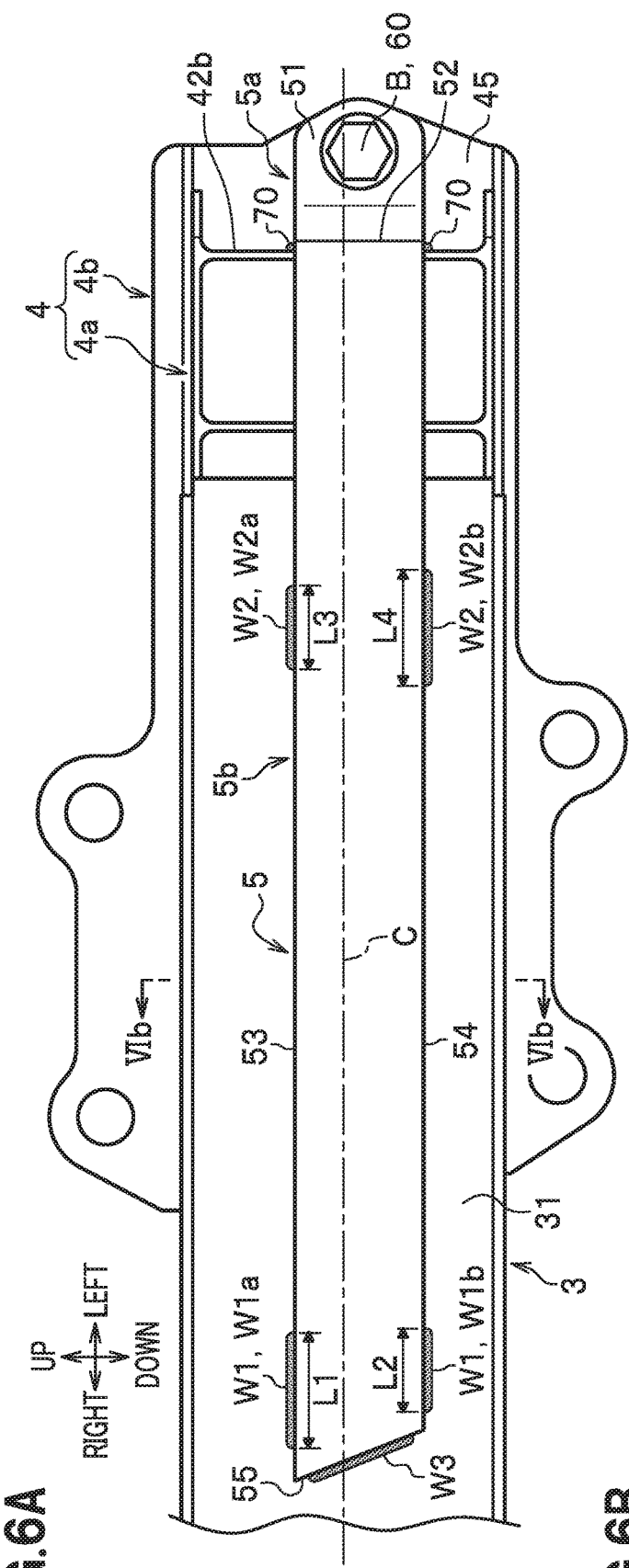
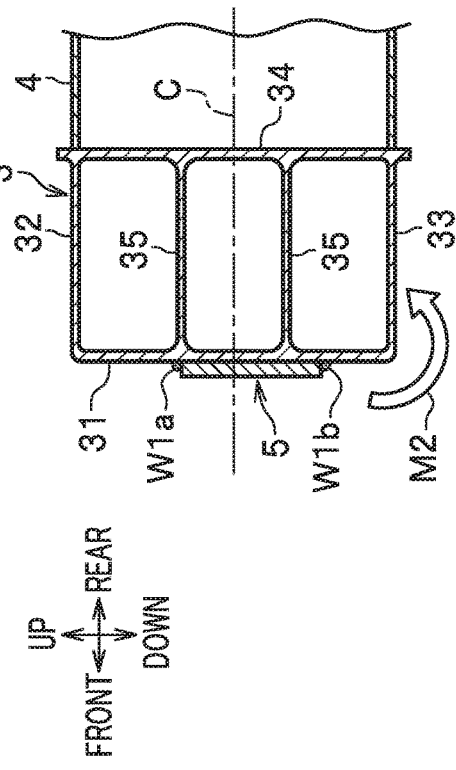
FIG.6A
FIG.6B

VEHICLE BODY STRUCTURE

CROSS REFERENCE TO RELATED APPLICATIONS

This application claims the foreign priority benefit under Title 35, United States Code, § 119 (a)-(d) of Japanese Patent Application No. 2017-135882, filed on Jul. 12, 2017, the disclosure of which is herein incorporated by reference in its entirety.

TECHNICAL FIELD

The present invention relates to a vehicle body structure.

BACKGROUND ART

As a vehicle body structure of an automobile, there is the vehicle body structure including a pair of left and right frame members extending in a front-rear direction, a bumper beam bridged over front ends of the pair of left and right frame members, and a spacer member for connecting the bumper beam and the frame member at the outside of the frame member in the vehicle width direction (see Patent Document 1).

CITATION LIST

Patent Literature

Patent Document 1: Japanese Patent Application Publication No. 2014-113894

SUMMARY OF INVENTION

Technical Problem

The vehicle body structure transmits a collision load input to a collision side of the bumper beam at the time of the offset collision to the frame member by the spacer member, but no consideration is given to a tensile load input to the non-collision side of the bumper beam at the time of the offset collision. Therefore, strength against the tensile load is insufficient on the non-collision side of the bumper beam, and separation between the bumper beam and the frame member may occur.

From such a viewpoint, an object of the present invention is to provide the vehicle body structure capable of preventing separation between the bumper beam and a bumper beam mounting member on the non-collision side at the time of the offset collision.

Solution to Problem

In order to solve the above problems, one aspect of the present invention is a vehicle body structure including a bumper beam extending in a vehicle width direction, a pair of left and right bumper beam mounting members provided outside in the vehicle width direction on a rear surface of the bumper beam and mounting the bumper beam on the vehicle body, and a pair of left and right holding members provided on a front surface of the bumper beam and connecting the bumper beam and the bumper beam mounting member. The holding member includes an outer mounting portion for mounting an outer side in the vehicle width direction of the holding member on the bumper beam mounting member, and a front mounting portion for mounting an inner side in the vehicle width direction of the holding member on the front surface of the bumper beam. The front mounting portion extends to a position corresponding to a vehicle width direction inner end portion of the bumper beam mounting member in a front-rear direction at least on the front surface of the bumper beam.

Advantageous Effects of Invention

With the vehicle body structure according to the present invention, it is possible to increase the strength against the tensile load input to the bumper beam on the non-collision side at the time of the offset collision.

BRIEF DESCRIPTION OF DRAWINGS

FIG. 5A is a front view showing a bumper beam and a holding member according to the embodiment;

FIG. 5B is a cross-sectional view taken along a line Vb-Vb of FIG. 5A;

FIG. 6A is a front view showing the bumper beam and the holding member according to a modification; and FIG. 6B is a cross-sectional view taken along a line VIb-VIb of FIG. 6A.

DESCRIPTION OF EMBODIMENTS

Figure 1:
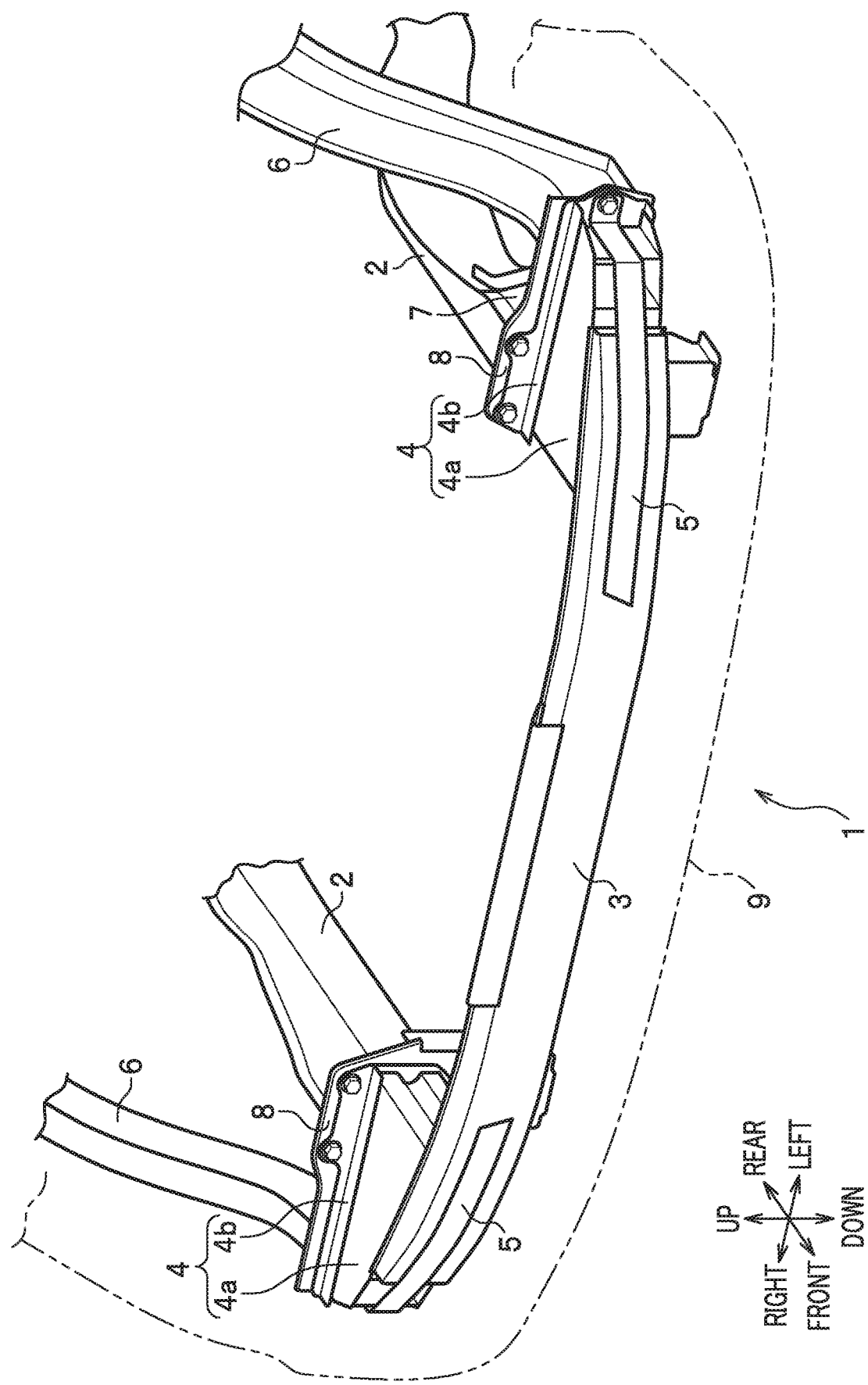
FIG. 1 is a perspective view showing a vehicle body structure according to an embodiment of the present invention.

Next, an embodiment of the present invention will be described in detail with reference to the drawings as appropriate. "FRONT-REAR" and "UP-DOWN" shown by arrows in the drawings respectively indicate a vehicle front-rear direction and a vehicle up-down direction, and "LEFT-RIGHT" indicates a left-right direction (vehicle width direction) viewed from a driver's seat. A vehicle body structure 1 of the present embodiment has a symmetrical structure with a central portion in the left-right direction (vehicle width direction) of a vehicle body as a boundary.

As shown in FIG. 1, the vehicle body structure 1 according to the embodiment of the present invention includes a pair of left and right front side frames 2, 2, a bumper beam 3, a pair of left and right bumper beam mounting members 4, 4, a pair of left and right holding members 5, 5, a pair of left and right lower members 6, 6, and a pair of left and right gusset members 7, 7 (only the left side is shown).

The front side frame 2 as the vehicle body is a metal structural member extending in the front-rear direction. The front side frame 2 is formed in a hollow structure having a closed cross-section. Connecting plates 8 are respectively fixed to front end portions of the pair of left and right front side frames 2, 2. The connecting plate 8 is a metal plate member that connects the front side frame 2 and the bumper beam mounting member 4 to each other. The connecting plate 8 extends in the up-down direction and in the vehicle width direction. The front end portion of the front side frame 2 is fixed to a rear surface of a mounting plate 4b of the bumper beam mounting member 4 via the connecting plate 8.

As shown in FIG. 1, the bumper beam 3 is a metal member extending in the vehicle width direction. The bumper beam 3 is bridged between front end portions of a pair of left and right bumper beam extensions 4a, 4a at the same height as the front end portions of the pair of left and right front side frames 2, 2. The bumper beam 3 is bent to be positioned on the vehicle inner side (rearward in the embodiment) in the front-rear direction as it goes outward in the vehicle width direction at both left and right end portions thereof. The bumper beam 3 is covered with a bumper face 9 indicated by an imaginary line in FIG. 1.

Figure 2:
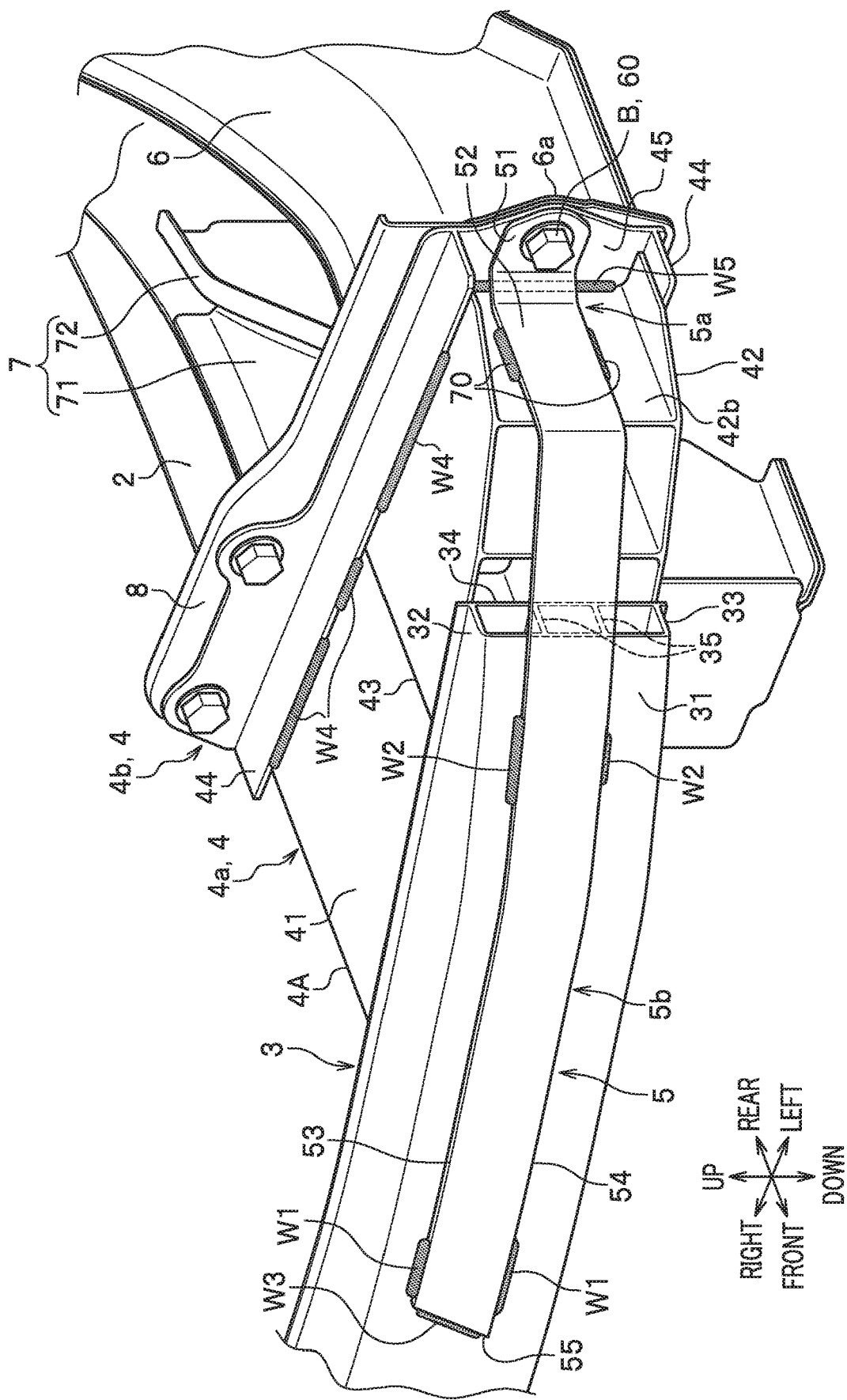
FIG. 2 is a partially enlarged perspective view of the vehicle body structure shown in FIG. 1.

In the present embodiment, the bumper beam 3 is formed of an extruded shape material of an aluminum alloy, but it may be formed of another metal material, a resin material, or the like. As shown in FIG. 2, the bumper beam 3 is formed in a hollow structure having a closed cross-section made of three parts. The bumper beam 3 integrally includes a front surface portion 31, an upper surface portion 32, a lower surface portion 33, a rear surface portion 34, and a plurality of transverse ribs 35.

The front surface portion 31 is a portion extending in the up-down direction and the vehicle width direction. The front surface portion 31 is a contact surface which the deformed bumper face 9 or the like hits when the vehicle collides with an object to be collided. The upper surface portion 32 is a portion extending in the front-rear direction and the vehicle width direction. The upper surface portion 32 extends rearward from an upper end portion of the front surface portion 31.

The lower surface portion 33 is a portion extending in the front-rear direction and the vehicle width direction. The lower surface portion 33 extends rearward from a lower end portion of the front surface portion 31. The rear surface portion 34 is a portion spaced rearward from the front surface portion 31 and extending in the up-down direction and the vehicle width direction. The rear surface portion 34 connects rear end portions of the upper surface portion 32 and the lower surface portion 33 to each other.

The plurality of transverse ribs 35 are portions extending in the front-rear direction and the vehicle width direction between the front surface portion 31 and the rear surface portion 34. The transverse rib 35 plays a role of increasing cross-sectional rigidity of the bumper beam 3. The number of the lateral ribs 35 is not particularly limited, but in the present embodiment, two are formed to divide the closed cross-section of the bumper beam 3 into upper and lower three parts.

Figure 3:
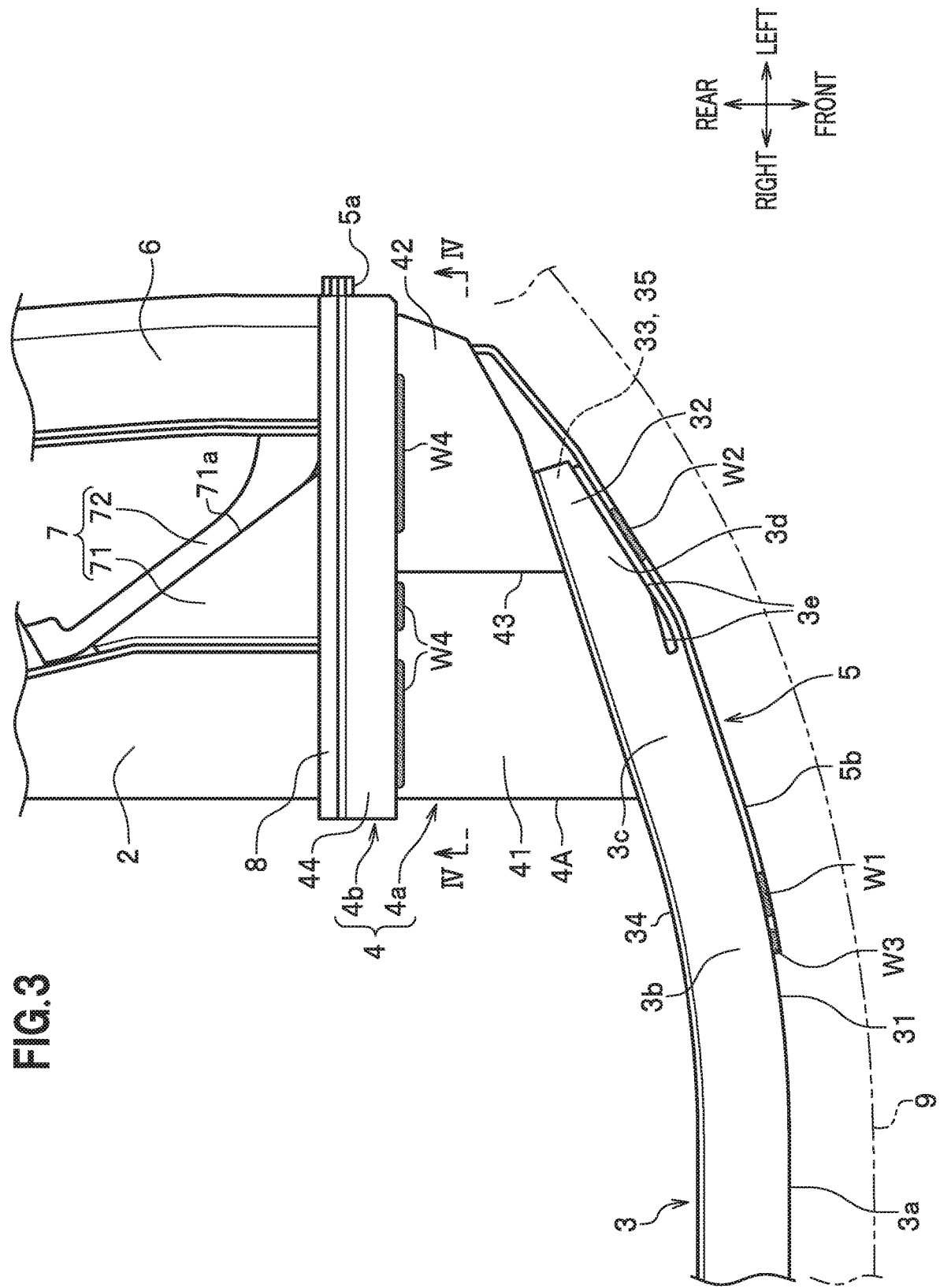
FIG. 3 is a plan view of FIG. 2.

As shown in FIG. 3, a linear portion 3a, a bent portion 3b, an inclined portion 3c, and a folded portion 3d are formed in the bumper beam 3.

The linear portion 3a is a portion extending linearly in the vehicle width direction. The linear portion 3a is formed on the center side in the vehicle width direction of the bumper beam 3.

The bent portion 3b is a portion bending from a vehicle width direction outer end portion of the linear portion 3a toward the bumper beam mounting member 4 (rearward in the embodiment). The bent portion 3b is located on the inner side in the vehicle width direction of a vehicle width direction inner end portion 4A of the bumper beam mounting member 4. The inclined portion 3c is a portion extending rearward as it goes outward in the vehicle width direction from a vehicle width direction outer end portion of the bent portion 3b.

The folded portion 3d is a portion formed by folding a vehicle width direction outer end portion of the inclined portion 3c so that the front surface portion 31 approaches the rear surface portion 34 as it goes outward in the vehicle width direction. More specifically, the folded portion 3d is formed by forming a cutout portion 3e opened at both the upper and lower sides and the vehicle outer side by cutting off a part of the upper surface portion 32, the lower surface portion 33, and the transverse rib 35, and by folding the front surface portion 31 toward the bumper beam mounting member 4 (rearward in the embodiment) along the cutout portion 3e. Although not shown, front and rear cut surfaces formed by the cutout portion 3e are fixed to each other by MIG welding. The folded portion 3d plays a role of increasing strength of a vehicle width direction outer end portion of the bumper beam 3.

As shown in FIG. 2, the bumper beam mounting member 4 is disposed on the outer side in the vehicle width direction in the rear surface portion 34 of the bumper beam 3, and is a metal member for mounting the bumper beam 3 on the front side frame 2. The bumper beam mounting member 4 is interposed between the bumper beam 3 and the front side frame 2. The bumper beam mounting member 4 includes the bumper beam extension 4a and the mounting plate 4b.

The bumper beam extension 4a is provided on the rear surface portion 34 of the bumper beam 3 and is a metal member extending in the front-rear direction. The bumper beam extension 4a projects outward in the vehicle width direction than the bumper beam 3. In the present embodiment, the bumper beam extension 4a is formed of the extruded shape material of the aluminum alloy, but it may be formed of another metal material, the resin material, or the like. The bumper beam extension 4a has a substantially trapezoidal shape in which a front-rear dimension is smaller as it goes outward in the vehicle width direction in a plan view. The bumper beam extension 4a has a box-shaped hollow structure opening front and rear, and is configured to be weaker than the bumper beam 3 and the front side frame 2 by selection of thickness or the like. Upon a collision of the vehicle, the bumper beam extension 4a absorbs an impact by crushing in the front-rear direction due to a collision load.

Figure 4:
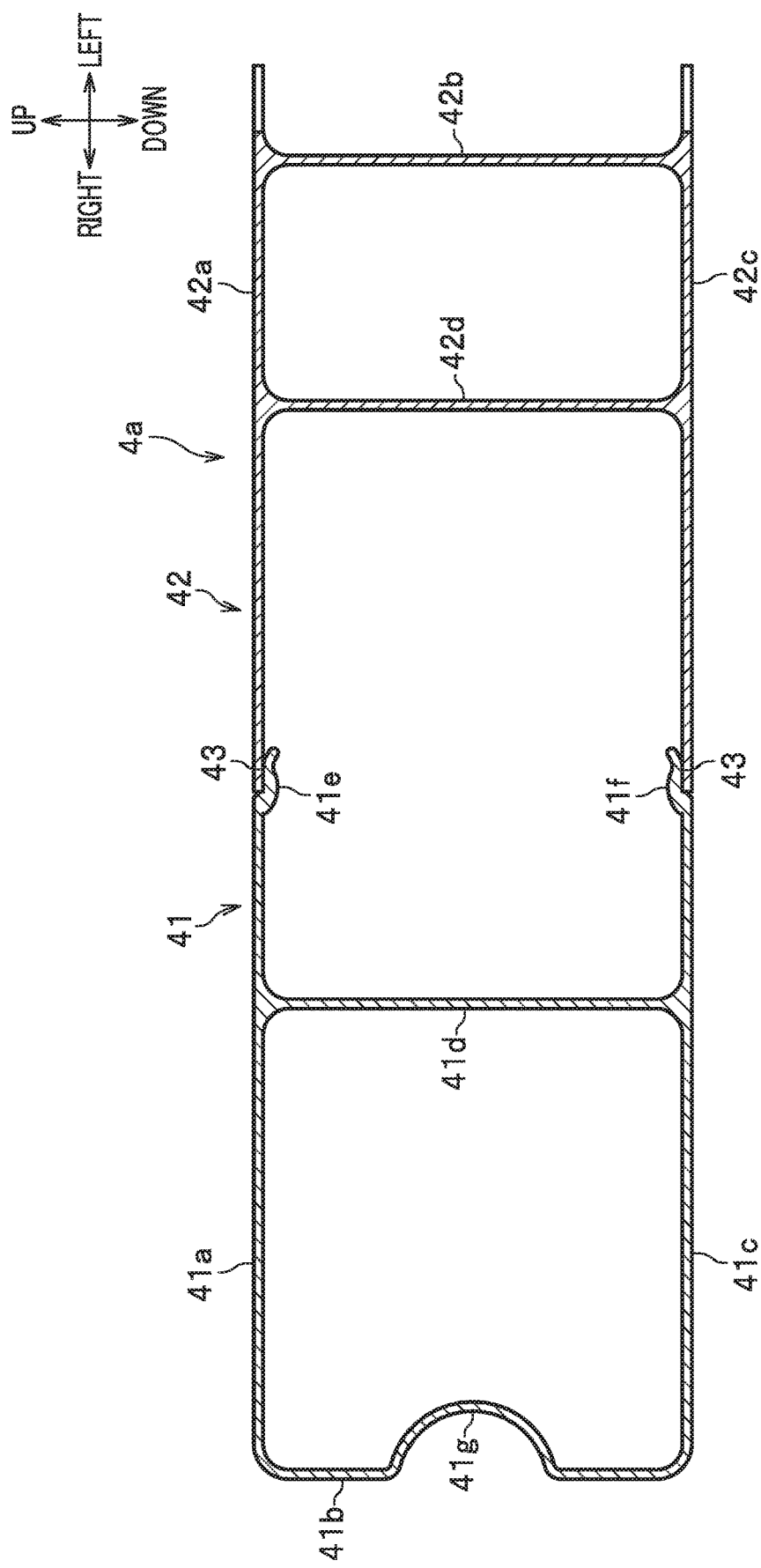
FIG. 4 is a cross-sectional view taken along a line IV-IV of FIG. 3.

As shown in FIG. 4, the bumper beam extension 4a includes a first divided body 41, a second divided body 42, a pair of upper and lower connecting portions 43, 43 for connecting the first divided body 41 and the second divided body 42. That is, the bumper beam extension 4a is divided into the first divided body 41 and the second divided body 42 in the vehicle width direction.

The first divided body 41 is located on the inner side in the vehicle width direction and is a portion constituting an upper wall portion, an inner wall portion, and a lower wall portion of the bumper beam extension 4a. The first divided body 41 has a substantially U-shaped cross-section opening outward in the vehicle width direction. The first divided body 41 integrally includes a first upper wall portion 41a, a first inner wall portion 41b, a first lower wall portion 41c, a first rib 41d, an upper projecting piece 41e, and a lower projecting piece 41f.

The first upper wall portion 41a is a portion constituting the inner side in the vehicle width direction of the upper wall portion of the bumper beam extension 4a. The first upper wall portion 41a extends in the front-rear direction and in the vehicle width direction.

The first inner wall portion 41b is a portion constituting the inner wall portion of the bumper beam extension 4a. The first inner wall portion 41b extends in the up-down direction and the front-rear direction. The first inner wall portion 41b extends downward from a vehicle width direction inner end portion of the first upper wall portion 41a. A bead 41g projecting outward in the vehicle width direction is formed in an up-down direction intermediate portion of the first inner wall portion 41b. The bead 41g has an arc-shaped cross-section. The bead 41g extends in the front-rear direction over an entire length of the first inner wall portion 41b.

The first lower wall portion 41c is a portion constituting the inner side in the vehicle width direction of the lower wall portion of the bumper beam extension 4a. The first lower wall portion 41c extends in the front-rear direction and in the vehicle width direction. The first lower wall portion 41c extends outward in the vehicle width direction from a lower end portion of the first inner wall portion 41b.

The first rib 41d is a portion for increasing the cross-sectional rigidity of the bumper beam extension 4a. The first rib 41d extends in the up-down direction and the front-rear direction between the first upper wall portion 41a and the first lower wall portion 41c. The first rib 41d is disposed outward of a center in the vehicle width direction of the first divided body 41.

The upper projecting piece 41e is a portion projecting outward in the vehicle width direction from a vehicle width direction outer end portion of the first upper wall portion 41a toward an inner surface of a second upper wall portion 42a. The upper projecting piece 41e is overlapped with the inner surface of the second upper wall portion 42a and they are fixed to each other by welding or the like. In this way, the upper connecting portion 43 in which the first divided body 41 and the second divided body 42 are connected is formed. The upper connecting portion 43 extends in the front-rear direction.

The lower projecting piece 41f is a portion projecting outward in the vehicle width direction from a vehicle width direction outer end portion of the first lower wall portion 41c toward an inner surface of a second lower wall portion 42c. The lower projecting piece 41f is overlapped with the inner surface of the second lower wall portion 42c and they are fixed to each other by welding or the like. In this way, the lower connecting portion 43 in which the first divided body 41 and the second divided body 42 are connected is formed. The lower connecting portion 43 extends in the front-rear direction.

The second divided body 42 is located on the outer side in the vehicle width direction and is a portion constituting the upper wall portion, the outer wall portion, and the lower wall portion of the bumper beam extension 4a. The second divided body 42 has a substantially U-shaped cross-section opening inward in the vehicle width direction. The second divided body 42 integrally includes the second upper wall portion 42a, a second outer wall portion 42b, a second lower wall portion 42c, and a second rib 42d.

The second upper wall portion 42a is a portion constituting the outer side in the vehicle width direction of the upper wall portion of the bumper beam extension 4a. The second upper wall portion 42a extends in the front-rear direction and in the vehicle width direction.

The second outer wall portion 42b is a portion constituting the outer wall portion of the bumper beam extension 4a. The second outer wall portion 42b extends in the up-down direction and the front-rear direction. The second outer wall portion 42b extends downward from the vehicle width direction outer end portion of the second upper wall portion 42a.

The second lower wall portion 42c is a portion constituting the outer side in the vehicle width direction of the lower wall portion of the bumper beam extension 4a. The second lower wall portion 42c extends in the front-rear direction and in the vehicle width direction. The second lower wall portion 42c extends inward in the vehicle width direction from a lower end portion of the second outer wall portion 42b.

The second rib 42d is a portion for increasing the cross-sectional rigidity of the bumper beam extension 4a. The second rib 42d extends in the up-down direction and the front-rear direction between the second upper wall portion 42a and the second lower wall portion 42c. The second rib 42d is disposed outward of a center in the vehicle width direction of the second divided body 42.

As shown in FIG. 2, the mounting plate 4b is a plate-like member provided on a rear surface of the bumper beam extension 4a. The mounting plate 4b extends in the up-down direction and in the vehicle width direction. In the present embodiment, the mounting plate 4b is formed of the extruded shape material made of the aluminum alloy, but it may be formed of another metal material. The mounting plate 4b has a pair of upper and lower fitting ribs 44, 44 and a mounting flange 45.

The pair of upper and lower fitting ribs 44, 44 projects forward and is a portion into which a rear surface side end portion of the bumper beam extension 4a is fitted. Each of the fitting ribs 44, 44 has a rectangular plate shape in a plan view and extends in the front-rear direction and the vehicle width direction. The upper fitting rib 44 is overlapped with an outer surface of the upper wall portion of the bumper beam extension 4a and they are fixed to each other by the MIG welding (see reference symbol W4). The lower fitting rib 44 is overlapped with an outer surface of the lower wall portion of the bumper beam extension 4a and they are fixed to each other by the MIG welding (not shown).

The mounting flange 45 is a portion located between the pair of upper and lower fitting ribs 44, 44 and located outside in the vehicle width direction of the bumper beam extension 4a and the bumper beam 3. The mounting flange 45 extends in the up-down direction and in the vehicle width direction. The MIG welding (see reference symbol W5) is applied to an inner corner formed by the mounting flange 45 and the second outer wall portion 42b of the bumper beam extension 4a.

The holding member 5 is provided on a front surface of the bumper beam 3 and is a metal member connecting the bumper beam 3 and the bumper beam mounting member 4. In the present embodiment, the holding member 5 is formed of the extruded shape material made of the aluminum alloy, but it may be formed of another metal material, a resin material, or the like. The holding member 5 extends substantially in the vehicle width direction from the outer side in the vehicle width direction of the bumper beam 3 to an overhanging portion of the bumper beam mounting member 4. The holding member 5 is disposed between the bumper beam 3 and the bumper face 9 (see FIG. 3). The holding member 5 is disposed offset to a direction (upward in the embodiment) in the up-down direction from a vertical center of the bumper beam 3. The holding member 5 integrally includes an outer mounting portion 5a and a front mounting portion 5b.

The outer mounting portion 5a is a portion for mounting the outer side in the vehicle width direction of the holding member 5 on the bumper beam mounting member 4. The outer mounting portion 5a includes a first mounting wall 51 and a second mounting wall 52.

The first mounting wall 51 is a portion extending in the up-down direction and the vehicle width direction. The first mounting wall 51 is overlapped with the mounting flange 45 of the mounting plate 4b, the connecting plate 8 and a front end flange 6a of the lower member 6, and they are fixed to each other by a bolt B. In this way, a first outer fixing portion 60 in which the first mounting wall 51, the mounting flange 45, the connecting plate 8 and the front end flange 6a are fixed is formed. The first mounting wall 51 and the mounting flange 45 extend in parallel to or substantially in parallel with a plane normal to the front-rear direction, and an axial direction of the bolt B is the same as or substantially the same as the front-rear direction. That is, the first mounting wall 51 of the outer mounting portion 5a is fixed to the mounting flange 45 in the front-rear direction. Fixing means such as spot welding may be used instead of the bolt B.

The second mounting wall 52 extends forward from a vehicle width direction inner end portion of the first mounting wall 51, and is a portion extending in the up-down direction and the front-rear direction. The second mounting wall 52 is overlapped with the second outer wall portion 42b of the bumper beam extension 4a and they are fixed to each other by the MIG welding. The MIG welding is applied to an inner corner formed by an upper side of the second mounting wall 52 and an outer surface of the second outer wall portion 42b and an inner corner formed by a lower side of the second mounting wall 52 and the outer surface of the second outer wall portion 42b. In this way, second outer fixing portions 70, 70 in which the second mounting wall 52 and the second outer wall portion 42b are fixed are formed.

The front mounting portion 5b is a portion for mounting an inner side in the vehicle width direction of the holding member 5 on the front surface portion 31 of the bumper beam 3. The front mounting portion 5b extends inward in the vehicle width direction from the front end portion of the second mounting wall 52. As shown in FIG. 3, the front mounting portion 5b extends to a position corresponding to the vehicle width direction inner end portion 4A of the bumper beam mounting member 4 in the front-rear direction, in the front surface portion 31 of the bumper beam 3. In the present embodiment, the front mounting portion 5b extends further inward in the vehicle width direction than the vehicle width direction inner end portion 4A and extends to the bent portion 3b. The front mounting portion 5b is overlapped with the front surface portion 31 of the bumper beam 3. As shown in FIG. 5A, the front mounting portion 5b includes an upper side 53, a lower side 54 spaced apart downward from the upper side 53, and an inclined side 55 connecting the vehicle width direction inner ends of the upper side 53 and the lower side 54.

First welded portions W1, W1 for fixing the front mounting portion 5b and the bumper beam 3 are respectively formed on the inner sides in the vehicle width direction of the upper side 53 and the lower side 54. Both the upper and lower first welded portions W1, W1 extend in the vehicle width direction. The upper first welded portion W1 (hereinafter also referred to as "first upper welded portion W1a") is formed by applying the MIG welding to an inner side in the vehicle width direction of an inner corner formed by the upper side 53 and the front surface portion 31 of the bumper beam 3. The lower first welded portion W1 (hereinafter also referred to as "first lower welded portion W1b") is formed by applying the MIG welding to the inner side in the vehicle width direction of an inner corner formed by the lower side 54 and the front surface portion 31 of the bumper beam 3.

The first upper welded portion W1a and the first lower welded portion W1b are formed at corresponding positions in the up-down direction. A welding length 1 in the vehicle width direction of the first upper welded portion W1a is formed shorter than a welding length L2 in the vehicle width direction of the first lower welded portion W1b (L1<L2). In other words, the welding length L2 in the vehicle width direction of the first lower welded portion W1b is formed longer than the welding length L1 in the vehicle width direction of the first upper welded portion W1a (L2>L1).

Second welded portions W2, W2 for fixing the front mounting portion 5b and the bumper beam 3 are respectively formed on the outer sides in the vehicle width direction of the upper side 53 and the lower side 54. Both the second welded portions W2, W2 extend in the vehicle width direction. The upper second welded portion W2 (hereinafter also referred to as "the second upper welded portion W2a") is formed by applying the MIG welding to an outer side in the vehicle width direction of the inner corner formed by the upper side 53 and the front surface portion 31 of the bumper beam 3. The lower second welded portion W2 (hereinafter also referred to as "second lower welded portion W2b") is formed by applying the MIG welding to the outer side in the vehicle width direction of the inner corner formed by the lower side 54 and the front portion 31 of the bumper beam 3.

The second upper welded portion W2a and the second lower welded portion W2b are formed at corresponding positions in the up-down direction. A welding length L4 in the vehicle width direction of the second lower welded portion W2b is formed shorter than a welding length L3 in the vehicle width direction of the second upper welded portion W2a (L4<L3). In other words, the weld length L3 in the vehicle width direction of the second upper welded portion W2a is formed longer than the welding length L4 in the vehicle width direction of the second lower welded portion W2b (L3>L4). The lengths of the upper and lower welding lengths L1 and L2 in the first welded portion W1 and the lengths of the upper and lower welding lengths L3 and L4 in the second welded portion W2 are upside down.

The inclined side 55 is formed in a vehicle width direction inner end portion of the front mounting portion 5b. The inclined side 55 is inclined to be located on the inner side in the vehicle width direction as it goes from one side (the upper side in the embodiment) out of the upper and lower sides to the other side (the lower side in the embodiment) out of the upper and lower sides. An inclined weld portion W3 for fixing the front mounting portion 5b and the bumper beam 3 is formed on the inclined side 55. The inclined weld portion W3 is formed by applying the MIG welding along an inner corner formed by the inclined side 55 and the front surface portion 31 of the bumper beam 3.

As shown in FIG. 3, the first welded portion W1 and the inclined welded portion W3 are formed in a position corresponding to the bent portion 3b in the front-rear direction, on the inner side in the vehicle width direction of the vehicle width direction inner end portion 4A of the bumper beam mounting member 4 and on the front surface portion 31 of the bumper beam 3. That is, the front mounting portion 5b is fixed to the position corresponding to the bent portion 3b in the front-rear direction, on the inner side in the vehicle width direction of the vehicle width direction inner end portion 4A of the bumper beam mounting member 4 and on the front surface portion 31 of the bumper beam 3. The second welded portion W2 is formed in a position corresponding to the folded portion 3d in the front-rear direction, on the front surface portion 31 of the bumper beam 3. That is, the front mounting portion 5b is also fixed to the position corresponding to the folded portion 3d in the front-rear direction, on the front surface portion 31 of the bumper beam 3.

As shown in FIG. 1, each of the pair of left and right lower members 6, 6 is a metal structural member extending in the front-rear direction on the outer side in the vehicle width direction of the pair of left and right front side frames 2, 2. The lower members 6, 6 are formed in a hollow structure having a closed cross-section. A front end portion of the lower member 6 is fixed to the rear surface of the mounting plate 4*b* via the connecting plate 8 by bolts, welding or the like. The lower member 6 is formed bent to be positioned higher towards the rear.

Each of the pair of left and right gusset members 7, 7 is a metallic member connecting the front side frame 2 and the lower member 6 on the rear side of the mounting plate 4*b* and the connecting plate 8. The gusset member 7 shown in FIG. 3 is disposed at a position corresponding to the connecting portion 43 and the folded portion 3*d* in the front-rear direction. The gusset member 7 includes a gusset body 71 and a reinforcing member 72.

The gusset body 71 has a triangular shape in a plan view, and is wider in the left-right direction as it goes forward. A front end portion of the gusset body 71 is fixed to the connecting plate 8 and the mounting plate 4*b* by bolts, welding or the like. A vehicle width direction inner end portion of the gusset body 71 is fixed to the front side frame 2 by bolts, welding, or the like. An inclined surface 71*a* inclined to be positioned on the outer side in the vehicle width direction toward the front is formed in a vehicle width direction outer end portion of the gusset body 71.

The reinforcing member 72 is a plate-like member extending along the inclined surface 71*a*. The reinforcing member 72 is fixed to the inclined surface 71*a* by bolts, welding, or the like. A rear end portion of the reinforcing member 72 is fixed to the front side frame 2 by bolts, welding or the like. A front end portion of the reinforcing member 72 is fixed to the lower member 6 by bolts, welding or the like.

The vehicle body structure 1 according to the present embodiment is basically configured as described above. Next, its function and effect will be described.

According to the present embodiment, as shown in FIG. 3, the holding member 5 connects the bumper beam 3 and the bumper beam mounting member 4, and the front mounting portion 5*b* of the holding member 5 extends to and is fixed to the position corresponding to the vehicle width direction inner end portion 4A of the bumper beam mounting member 4 in the front-rear direction at least in the front surface portion 31 of the bumper beam 3. According to this configuration, connection strength between the bumper beam 3 and the bumper beam mounting member 4 is increased. Thus, strength against a tensile load input to the bumper beam 3 on the non-collision side at the time of the offset collision is increased, and separation between the bumper beam 3 and the bumper beam mounting member 4 can be prevented. Further, it is possible to efficiently transmit the collision load input to the holding member 5 on the collision side and the bumper beam 3 to the bumper beam mounting member 4 at the time of the offset collision.

According to the present embodiment, as shown in FIG. 2, the mounting plate 4*b* has the bumper beam extension 4*a* and the mounting flange 45 positioned on the outer side in the vehicle width direction of the bumper beam 3, and the outer mounting portion 5*a* is fixed to the mounting flange 45 in the front-rear direction. According to this configuration, since the holding member 5 extends to the outer side in the vehicle width direction of the bumper beam extension 4*a*, the holding member 5 can be suitably set to be long, and thus the tensile strength of the bumper beam 3 on the non-collision side can be increased. In addition, since the outer mounting portion 5*a* and the mounting flange 45 are fixed in the front-rear direction, the tensile strength of the bumper beam 3 on the non-collision side can be further increased.

According to the present embodiment, as shown in FIG. 3, since the front mounting portion 5*b* extends to the bent portion 3*b*, the holding member 5 can be suitably set to be long, and thus the tensile strength of the bumper beam 3 on the non-collision side can be increased. In addition, it is possible to efficiently transmit the collision load input to the bumper beam 3 on the collision side to the bumper beam mounting member 4. In a structure in which the holding member 5 extends to the linear portion 3*a*, a length in the front-rear direction in a space on the rear side of the bumper face 9 is shortened by a thickness of the holding member 5. As a result, the design of the vehicle body may be affected in some cases. In addition, since a shock absorbing stroke of the bumper face 9 is reduced, the bumper face 9 may hit the holding member 5, and the impact may be transmitted to the bumper beam 3 through the holding member 5 even in a light collision. In this respect, according to the present embodiment, since the front mounting portion 5*b* extends only to the bent portion 3*b*, design flexibility and the shock absorbing stroke of the bumper face 9 can be suitably secured.

According to the present embodiment, as shown in FIG. 3, the bumper beam 3 has a folded portion 3*d* formed by folding the vehicle width direction outer end portion of the bumper beam 3 so that the front surface portion 31 approaches the rear surface portion 34 as it goes outward in the vehicle width direction. The front mounting portion 5*b* is fixed to the position corresponding to the folded portion 3*d* in the front-rear direction, in the front portion 31 of the bumper beam 3. According to this structure, the strength of the bumper beam 3 can be increased by the folded portion 3*d*. Further, since the front mounting portion 5*b* is fixed to the folded portion 3*d* having high strength, the collision load input to the holding member 5 on the collision side and the bumper beam 3 can be efficiently transmitted to the bumper beam mounting member 4.

According to the present embodiment, as shown in FIG. 4, the bumper beam extension 4*a* is divided into two in the vehicle width direction and has a connecting portion 43 for connecting the two divided bodies 41, 42, so that the strength in the front-rear direction can be increased. Further, as shown in FIG. 3, since the gusset member 7 is disposed at the position corresponding to the connecting portion 43 in the front-rear direction on the rear side of the connecting portion 43, the collision load input to the bumper beam extension 4*a* on the collision side can be efficiently transmitted to the front side frame 2 and the lower member 6 through the gusset member 7.

A vertical position of the first outer fixing portion 60 for fixing the mounting plate 4*b*, the holding member 5, and the like shown in FIG. 2 is changed by a welding position (not shown) between the mounting plate 4*b* and the lower member 6, and thus a position of the holding member 5 may be offset to one side in the up-down direction. Then, as shown in FIG. 5A, when the holding member 5 is disposed offset to a direction (upward in the embodiment) in the up-down direction from a vertical center C of the bumper beam 3, a moment M1 is applied to the bumper beam 3 on the collision side so that an upper side thereof rotates rearward, and a similar moment M1 is also applied to the holding member 5 on the collision side as shown in FIG. 5B. In this respect, in a structure in which the inclined welded portion W3 is formed on the inclined side 55 shown in FIG. 5A, it is possible to secure a longer weld length as compared with a case in which the weld portion is formed on a straight side extending in the up-down direction, thereby increasing the connection strength between the holding member 5 for the moment M1 and the bumper beam 3. Thus, it is possible to prevent the holding member 5 on the collision side from peeling off due to the moment M1. In addition, in a structure in which the inclined side 55 shown in FIG. 5A is inclined to be located on the inner side in the vehicle width direction from the upper side to the lower side, even when the weld length L2 of the first lower welded portion W1*b* is formed to be longer than the weld length L1 of the first upper welded portion W1*a*, the first upper welded portion W1*a* and the first lower welded portion W1*b* can be arranged at corresponding positions in the up-down direction.

When the MIG welding is used as the first welded portion W1, the strength of the holding member 5 itself is reduced due to thermal influence of the MIG welding, to be weak against the load (crush) in the front-rear direction. Further, as shown in FIG. 5B, when the holding member 5 is disposed offset to the upper side which is one of the upper and lower sides with respect to the vertical center C of the bumper beam 3, the large moment M1 is applied to the lower side of the holding member 5. In this respect, in the structure in which the first upper welded portion W1*a*, which is one of the upper and lower portions of the first welded portion W1 shown in FIG. 5A, is formed to be shorter than the first lower welded portion W1*b* which is the other one of the upper and lower portions, it is possible to prevent a reduction in strength due to the thermal influence of welding in the first upper welded portion W1*a*, and thus it is possible to increase the strength against the load in the front-rear direction. Since the welding length of the first lower welded portion W1*b* can be longer than that of the first upper welded portion W1*a*, it is possible to increase the connection strength between the holding member 5 and the bumper beam 3 with respect to the moment M1. This makes it possible to prevent the holding member 5 on the collision side from peeling off due to the moment M1.

As shown in FIG. 5A, in the first welded portion W1, the welding length L1 of the first upper welded portion W1*a* is short and the welding length L2 of the first lower welded portion W1*b* is long (L1<L2). Therefore, when the upper and lower welding lengths L3, L4 in the second welded portion W2 are the same (L3=L4), or the upper welding length L3 is shorter than the lower welding length L4 as in the first welded portion W1 (L3<L4), there is a difference in strength between the upper and lower depending on a difference between the upper and lower welding lengths (upper welding length L1+L3<lower welding length L2+L4). As a result, when the tensile load is input to the holding member 5 on the non-collision side, the holding member 5 on the non-collision side may be twisted, and the tensile load may not be efficiently prevented by the holding member 5. In this respect, in the structure in which the second lower welded portion W2*b*, which is the other one of the upper and lower portions of the second welded portion W2 shown in FIG. 5A, is formed to be shorter than the second upper welded portion W2*a* which is the one of the upper and lower portions, the lengths of the upper and lower welding lengths L1 and L2 in the first welded portion W1 and the lengths of the upper and lower welding lengths L3 and L4 in the second welded portion W2 are in an upside down relationship, and thus it is possible to balance upper and lower strengths. This makes it possible to prevent the holding member 5 on the non-collision side from twisting, and to efficiently prevent the tensile load by the holding member 5.

Hereinabove, the embodiments of the present invention have been described in detail with reference to the drawings, however, the present invention is not limited thereto but can be appropriately changed without departing from the scope of the invention. In the present embodiment, a case where the present invention is applied to the front portion (front bumper) of the vehicle body has been exemplified, but the present invention can also be applied to the rear portion (rear bumper) of the vehicle body. In the present embodiment, the front mounting portion 5*b* extends to the bent portion 3*b*, but it may be extended to at least a position corresponding to the vehicle width direction inner end portion 4A of the bumper beam mounting member 4 in the front-rear direction. In the present embodiment, the upper projecting piece 41*e* and the lower projecting piece 41*f* are provided in the first divided body 41, however, they may be provided in the second divided body 42. In the present embodiment, although the holding member 5 is disposed offset to the upper side with respect to the vertical center C of the bumper beam 3, the center C of the bumper beam 3 in the vertical direction may be aligned with the vertical center of the pressing member 5. In this case, the vehicle width direction inner end portion of the holding member 5 may be disposed without being inclined. Further, the upper and lower welding lengths L1, L2 in the first welded portion W1 may be the same (L1=L2), or the upper and lower welding lengths L3, L4 in the second welded portion W2 may be the same (L3=L4). Further, the upper and lower welding lengths L1, L2 in the first welded portion W1 and the upper and lower welding lengths L3, L4 in the second welded portion W2 may be all the same (L1=L2=L3=L4). Furthermore, as shown in FIGS. 6A and 6B, the holding member 5 may be disposed offset to the lower side of the vertical center C of the bumper beam 3. In this case, an inclination direction of the inclined side 55, lengths of the upper and lower welding lengths L1, L2 in the first welded portion W1, and lengths of the upper and lower welding lengths L3, L4 in the second welded portion W2 are reverse to those in the above-described embodiment. The inclined side 55 shown in FIG. 6A is inclined to be located on the inner side in the vehicle width direction as it goes to the upper side from the lower side. The welding length L2 in the vehicle width direction of the first lower welded portion W1*b* is formed to be shorter than the welding length L1 in the vehicle width direction of the first upper welded portion W1*a* (L2<L1). In other words, the welding length L1 in the vehicle width direction of the first upper side welded portion W1*a* is formed to be longer than the welding length L2 in the vehicle width direction of the first lower side welded portion W1*b* (L1>L2). The welding length L3 in the vehicle width direction of the second upper welded portion W2*a* is formed to be shorter than the welding length L4 in the vehicle width direction of the second lower welded portion W2*b* (L3<L4). In other words, the welding length L4 in the vehicle width direction of the second lower welded portion W2*b* is formed to be longer than the welding length L3 in the vehicle width direction of the second upper welded portion W2*a* (L4>L3). When the holding member 5 is disposed offset to the lower side as in the modification, a moment M2, which is vertically symmetrical with the embodiment, is applied to the bumper beam 3 on the collision side so that the lower side thereof rotates rearward as shown in FIG. 6B, and the same moment M2 is also applied to the holding member 5 on the collision side. According to the modification, substantially the same operational effects as those of the embodiment can be obtained for the moment M2.

REFERENCE SIGNS LIST

1: vehicle body structure
2: front side frame (vehicle body, side frame)
3: bumper beam
3b: bent portion
3d: folded portion
4: bumper beam mounting member
4A: vehicle width direction inner end portion
4a: bumper beam extension
4b: mounting plate
5: holding member
5a: outer mounting portion
5b: front mounting portion
6: lower member
7: gusset member
31: front surface portion (front surface)
34: rear surface portion (rear surface)
41: first divided body
42: second divided body
43: connecting portion
45: mounting flange
53: upper side
54: lower side
55: inclined side
C: vertical center
W1: first welded portion
W1a: first upper welded portion
W1b: first lower welded portion
W2: second welded portion
W2a: second upper welded portion
W2b: second lower welded portion
W3: inclined welded portion
L1 to L4: welding length

The invention claimed is:

1. A vehicle body structure comprising:
a bumper beam extending in a vehicle width direction;
a pair of left and right bumper beam mounting members provided outside in the vehicle width direction on a rear surface of the bumper beam and mounting the bumper beam on the vehicle body; and
a pair of left and right holding members provided on a front surface of the bumper beam and connecting the bumper beam and the bumper beam mounting member, wherein
the holding member comprises:
an outer mounting portion for mounting an outer side in the vehicle width direction of the holding member on the bumper beam mounting member; and
a front mounting portion for mounting an inner side in the vehicle width direction of the holding member on the front surface of the bumper beam,
the front mounting portion extends to a position corresponding to a vehicle width direction inner end portion of the bumper beam mounting member in a front-rear direction at least on the front surface of the bumper beam,
the holding member is disposed offset to one side in an up-down direction with respect to a center in the up-down direction of the bumper beam,
an inclined side inclined to be located on the inner side in the vehicle width direction as it goes from the one side in the up-down direction to the other side in the up-down direction is formed in a vehicle width direction inner end portion of the front mounting portion, and
an inclined welded portion for fixing the front mounting portion and the bumper beam is formed on the inclined side.

2. The vehicle body structure according to claim 1, wherein
the bumper beam mounting member comprises:
a bumper beam extension provided on the rear surface of the bumper beam and extending in the front-rear direction; and
a mounting plate provided on a rear surface of the bumper beam extension and extending in the vehicle width direction, wherein
the mounting plate has a mounting flange positioned outside in the vehicle width direction of the bumper beam extension and the bumper beam, and
the outer mounting portion is fixed to the mounting flange in the front-rear direction.

3. The vehicle body structure according to claim 1, wherein
the bumper beam comprises:
a linear portion extending in the vehicle width direction; and
a bent portion bent from a vehicle width direction outer end portion of the linear portion toward the bumper beam mounting member and located inside in the vehicle width direction of the vehicle width direction inner end portion of the bumper beam mounting member, and wherein
the front mounting portion extends to the bent portion.

4. The vehicle body structure according to claim 1, wherein
the bumper beam has a folded portion formed by folding a vehicle width direction outer end portion of the bumper beam such that a front surface thereof is closer to a rear surface thereof as it goes to the outer side in the vehicle width direction, and
the front mounting portion is fixed to a position corresponding to the folded portion in the front-rear direction on a front surface of the bumper beam.

5. The vehicle body structure according to claim 2, further comprising:
a pair of left and right side frames fixed to a rear surface of the mounting plate and extending in the front-rear direction;
a pair of left and right lower members fixed to the rear surface of the mounting plate and extending in the front-rear direction on the outer side in the vehicle width direction of the side frames; and
a gusset member for connecting the side frame and the lower member on the rear surface side of the mounting plate, wherein
the bumper beam extension is divided in a vehicle width direction into a first divided body located inside in the vehicle width direction and a second divided body located outside in the vehicle width direction,
the bumper beam extension has a connecting portion for connecting the first divided body and the second divided body, and
the gusset member is disposed at a position corresponding to the connecting portion in the front-rear direction.

6. The vehicle body structure according to claim 1, wherein
the front mounting portion comprises:
an upper side; and
a lower side separated downward from the upper side, first welded portions for fixing the front mounting portion and the bumper beam are respectively formed inside in the vehicle width direction of the upper side and the lower side, and a welding length of the first welded portion of one of the upper side and the lower side is formed shorter than that of the first welded portion of the other of the upper side and the lower side.

7. The vehicle body structure according to claim 6, wherein second welded portions for fixing the front mounting portion and the bumper beam are respectively formed outside in the vehicle width direction of the upper side and the lower side, and a welding length of the second welded portion of the other of the upper side and the lower side is formed shorter than that of the second welded portion of the one of the upper side and the lower side.

* * * * *